(12) United States Patent
Stiegler et al.

(10) Patent No.: US 12,380,481 B2
(45) Date of Patent: Aug. 5, 2025

(54) ITEM DIMENSIONS OUTLIER DETECTION SYTEMS AND METHODS

(71) Applicant: Target Brands, Inc., Minneapolis, MN (US)

(72) Inventors: Cole Stiegler, Minneapolis, MN (US); Mansi Tripathi, Minneapolis, MN (US); Dakota R. Brown, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 270 days.

(21) Appl. No.: 18/076,830

(22) Filed: Dec. 7, 2022

(65) Prior Publication Data

US 2023/0186364 A1 Jun. 15, 2023

Related U.S. Application Data

(60) Provisional application No. 63/287,862, filed on Dec. 9, 2021.

(51) Int. Cl.
G06Q 30/00 (2023.01)
G06Q 30/0601 (2023.01)

(52) U.S. Cl.
CPC ................ *G06Q 30/0627* (2013.01)

(58) Field of Classification Search
CPC ........................ G06Q 30/0627; G06Q 30/06
USPC ................................................. 705/26, 27
See application file for complete search history.

(56) References Cited

U.S. PATENT DOCUMENTS

| 7,085,677 | B1 | 8/2006 | Champlin et al. |
| 9,142,035 | B1* | 9/2015 | Rotman ........... G07B 17/00661 |
| 10,045,218 | B1* | 8/2018 | Stapleton ................. G06N 5/01 |
| 10,614,056 | B2 | 4/2020 | Ignatyev |
| 10,984,378 | B1* | 4/2021 | Eckman ........... G06K 19/06131 |
| 2012/0054184 | A1* | 3/2012 | Masud .................. G06F 16/285 |
| | | | 707/E17.091 |
| 2016/0239792 | A1 | 8/2016 | Burch et al. |
| 2018/0081855 | A1 | 3/2018 | Cormier et al. |
| 2018/0189294 | A1 | 7/2018 | Anand et al. |

OTHER PUBLICATIONS

Cubetape: "The Freight Dimensioner Tha Save You Time and Money," cubetape.com/freight-dimensioner, Jun. 27, 2019, Google 5pgs. (Year: 2019).*

* cited by examiner

*Primary Examiner* — Robert M Pond
(74) *Attorney, Agent, or Firm* — Fish & Richardson P.C.

(57) ABSTRACT

Disclosed are systems and methods for determining item dimension accuracy. The method can include receiving, by a computing system, dimensions data for an item and retrieving, from a data store, one or more machine learning models that were trained to determine accuracy of the dimensions data for the item relative to similar items in a same category of items. The models were trained using a training dataset of dimensions data for other items and positive dimensions accuracy determinations for the other items. The method can also include applying, by the computing system, the one or more models to the dimensions data, determining, based on application of the one or more models to the dimensions data, an accuracy metric of the dimensions data for the item, and generating output indicating the accuracy metric of the dimensions data for the item.

20 Claims, 8 Drawing Sheets

ITEM DIMENSIONS OUTLIER DETECTION SYTEMS AND METHODS

CROSS-REFERENCE TO RELATED APPLICATIONS

This application claims priority to U.S. Provisional Application Ser. No. 63/287,862, filed on Dec. 9, 2021, the disclosure of which is incorporated by reference in its entirety.

TECHNICAL FIELD

This document describes devices, systems, and methods related to determining accuracy of item dimensions.

BACKGROUND

In retail environments, such as stores, and throughout a supply chain, items can vary in size, including width, height, depth, and/or weight. The items can vary based on actual size and/or package size. Actual size of an item (e.g., item dimensions) can be dimensions or size of the item when it is fully assembled and out of manufacturer's original packaging. The package size can be dimensions or size of the item in the manufacturer's original packaging.

SUMMARY

The document generally relates to determining when item dimensions are inaccurate. The item dimensions can include depth, width, height, and/or weight of the item. In some implementations, the item dimensions can also include volume and/or density. The volume and/or density can be predetermined and part of the item dimensions. Sometimes, the volume and/or density can be determined by a computer system as part of the disclosed techniques for identifying item dimensions accuracy. The item dimensions can correspond to dimensions of an item's packaging, which may be important to retail environments (e.g., stores), item suppliers, and/or shipping entities for calculating shipping costs, planning shipping schedules, and stocking items on shelves. In some implementations, the item dimensions can correspond to dimensions of an actual item (e.g., an item for sale without packaging), which may be important to customers and other end users seeking to purchase the actual item. Sometimes, the package size and/or the actual size of the item may be incorrectly recorded and stored. The incorrect dimensions can be provided to end consumers and/or other relevant stakeholders, which may lower end consumer expectations, reduce storage efficiency and use of space, and/or result in higher shipping costs. Thus, identifying incorrect item dimensions can help improve item descriptions, thereby improving customer satisfaction since correct information can be provided on which customers may base their purchasing decisions. This may lead to a reduction in returned items for which the listed item dimensions are not the correct dimensions. Identification of item dimension outliers can also improve placement and shelving of items in stores by allowing items to be placed on shelves that are appropriately sized rather than potentially placed on shelves based on incorrect item sizes. Hereinafter, item dimensions data can refer to either item packaging dimensions, actual item dimensions, or both.

More particularly, the disclosed techniques provide for collecting and reporting data on item dimensions in comparison to typical dimensions for similar items (e.g., items in a same category) to identify items that are outliers with respect to item dimensions. Tracking of item dimensions and automatic identification of outliers can help determine situations in which recorded item dimensions for particular items may be incorrect and should be updated/fixed.

Items can be grouped into item categories. Using one or more machine learning trained models, data plots of dimensions can be generated for each item in an item category. Each item's plot can then be compared to the data plots of other items in the same category to identify outliers—items that deviate from expected item dimensions by more than a predetermined threshold amount. Identification of outliers can be based on preset and/or dynamic thresholds. As illustrative examples, outliers can be identified as items that are more than 20% outside of the average for each item dimension and/or an average of 20% outside of the average for all item dimensions, collectively, in the item category. As another example, thresholds can be automatically set such that 1%, 2.5%, 5%, etc., of items can be identified as outliers. Blanket threshold rules may also be applied in some implementations. As yet another example, items over (or under) certain predetermined weights and/or other dimensional values may be automatically flagged as outliers. Sometimes, these weight and other dimensional value limits may be set high to intentionally catch/detect typos or other incorrectly entered information. For example, items that have 0 as one of the dimensions (e.g., height, width, depth, and/or weight) may be flagged as outliers. Items having all or a majority of dimensions listed with a value of 1 (e.g. height, width, and length dimensions of 1×1×1) may also be flagged as outliers.

Once an item is identified as an outlier, one or more relevant users can be provided a notification indicating that the item is an outlier. The notification can request additional physical inspection (e.g., at a warehouse or store) to determine if the outlier status is due to the item actually being an outlier or due to the item dimensions data being incorrect as stored (e.g., in a data store). Alternatively or additionally, the notification can be sent to a manufacturer, supplier, vendor, or other relevant stakeholder and can request correct/updated dimensions data for the outlier(s).

One or more embodiments described herein can include a method for determining item dimension accuracy, the method including receiving, by a computing system, dimensions data for an item, retrieving, by the computing system and from a data store, one or more machine learning models that were trained, using a training dataset of dimensions data for other items and positive dimensions accuracy determinations for the other items, to determine accuracy of the dimensions data for the item relative to similar items in a same category of items, applying, by the computing system, the one or more models to the dimensions data, determining, by the computing system and based on application of the one or more models to the dimensions data, an accuracy metric of the dimensions data for the item, and generating, by the computing system, output indicating the accuracy metric of the dimensions data for the item.

In some implementations, the embodiments described herein can optionally include one or more of the following features. For example, the dimensions data can include at least one of height, width, depth, weight, volume, and density of the item. The dimensions data may also include at least one of height, width, depth, weight, volume, and density of an actual size of the item without corresponding item packaging. Sometimes, the dimensions data can include at least one of height, width, depth, weight, volume, and density of the item with corresponding item packaging.

In some implementations, generating, by the computing system, output indicating the accuracy metric of the dimensions data for the item can include determining whether the accuracy metric of the dimensions data for the item exceeds a predetermined threshold value. The method can also include determining, by the computing system and based on the accuracy metric being less than the predetermined threshold value, that the item is an outlier, and generating, by the computing system, output indicating that the item is an outlier.

As another example, the one or more models can include at least one of principle component analysis, minimum covariant determinant, isolation forest, max z-score via standard deviation, and max z-score via median deviation. In some implementations, determining, by the computing system and based on application of the one or more models to the dimensions data, an accuracy metric of the dimensions data for the item can include determining an accuracy metric based on application of each of the one or more models to the dimensions data, identifying a quantity of the accuracy metrics that are below a predetermined threshold value, determining whether the quantity is greater than a predetermined threshold quantity, and determining, based on the quantity being greater than the predetermined threshold quantity, that the item is an outlier.

In some implementations, determining, by the computing system and based on application of the one or more models to the dimensions data, an accuracy metric of the dimensions data for the item can also be based on identifying a category associated with the item, determining whether the dimensions data for the item is within a predetermined threshold range of dimensions data for other items in the category associated with the item, and identifying, based on determining that the dimensions data for the item is not within the predetermined threshold range, the item as an outlier in the category associated with the item.

In yet some implementations, generating, by the computing system, output indicating the accuracy metric of the dimensions data for the item can include determining one or more operations to be performed to increase the accuracy metric of the dimensions data for the item. The one or more operations can include at least one of contacting a supplier for updated dimensions data for the item, requesting a physical inspection of the item, requesting a digital inspection of the dimensions data for the item, and automatically performing a systemic check of the dimensions data for the item.

As another example, the method can include generating, by the computing system, the training dataset based on identifying dimensions data of the other items that exceeds a predetermined threshold range and removing the identified dimensions data of the other items from the training dataset. In some implementations, the predetermined threshold range can include at least one of a weight of any of the other items that exceeds a threshold weight range, a dimension of 0 inches for any of the other items, a dimension of more than 150 inches for any of the other items, and weight, depth, and height of 1×1×1 inches for any of the other items.

One or more embodiments described herein can include a system for determining item dimension accuracy, the system can include one or more processors and one or more computer-readable devices including instructions that, when executed by the one or more processors, cause the computerized system to perform operations that include the method described above. In some implementations, the system described herein can optionally include any one or more of the abovementioned features.

The devices, system, and techniques described herein may provide one or more of the following advantages. For example, the disclosed techniques can improve order management. Unreasonably large item dimensions can prevent digital orders from being successfully submitted or fulfilled, because there are automated checks in an order pipeline and/or because the value is large enough to not be accepted by a guest order management system. This can result in guest orders being cancelled or not being successfully placed in the first place. Therefore, by identifying inaccuracies in item dimensions and addressing them, digital orders can be successfully submitted and fulfilled. Similarly, automatically validating item dimensions can prevent orders from being missed and/or cancelled due to impossible dimensions breaking downstream systems. The disclosed techniques can help enable reverse logistics to charge back partners for return shipping costs, ensure guests know what to expect in the mail and/or at the store, and identify and remove manual rules that may exist to check item dimensions. Moreover, the disclosed techniques can increase business partner confidence in dimensions accuracy predictions and provide an effective data quality check for every incoming item and updated item in the retail environment's ecosystem.

As another example, the disclosed techniques can reduce returns and other shipping logistics costs. Shipping companies make shipping decisions based on size and weight data. Sometimes, shipping companies may fine retail environments for incorrect item dimensions and/or charge the higher of a listed weight or an actual weight of the item to be shipped. Similarly, shipping companies may fine retailers for providing incorrect size dimensions or charge the for a larger listed size than an actual size of the product. Thus incorrect dimension data (including incorrect weight data) can lead to additional costs in shipping such items. Providing correct size and weight data ensures that shipping resources are used efficiently (e.g., trucks are full but all items identified for a particular shipment can still actually fit in the load). Ensuring that trucks/planes/boats are full (i.e., due to correct dimensions data being provided) can preserve fuel and other resources (e.g., the need to keep larger fleets) thereby reducing emissions of greenhouse gases and other pollution due to inefficient and unnecessary fuel consumption. Having correct package or product dimension attributes (height, width, depth, weight) can ensure that accurate shipping containers, such as boxes or other containers, of appropriate size, durability, or other attribute are selected for shipping products, including when shipping products to retail locations, shipping products to individual customers, or shipping product returns. Providing correct dimension data to shipping partners can also reduce the need for keeping additional reserve trucks/planes/boats on hand to handle additional freight in situations in which listed item dimensions are significantly smaller than the actual item sizes (e.g., situations in which the predicted space for shipping the items based on the listed item size is much less than the actual space required). Some retail environments may incur the cost of return shipping back to partners, manufacturers, and other third parties in the supply chain. Return logistics expenses can be unpredictable for oversize and less-than-truckload items. Thus, identifying and addressing inaccurate item dimensions can provide for more accurate return and other shipping costs to be calculated and used.

Identifying and addressing inaccurate item dimensions can also conserve resources by ensuring that storage is used efficiently. For example, a box of makeup can be incorrectly logged to have dimensions of a stereo. The box of makeup may then be stored in a location in a warehouse, distribution center, or other facility that is intended for storing larger items (e.g., based on weight and/or height, width, and/or depth), such as stereos. This location may not be efficiently used for storage, which means larger items such as stereos may be placed in other locations that may not be as desirable for the dimensions of the larger items. The disclosed techniques, therefore, can provide for inaccurate item dimensions to be identified and addressed so that items can be stored in locations that are meant for their size. The locations in the warehouse can then be used more efficiently and location utilization and planning can be optimized.

As another example and in some implementations, the disclosed techniques can improve consumer expectations and assist consumers in making purchasing decisions. If item listings include accurate item dimensions data, the consumers can rely on this information in making decisions of whether to purchase the items. An example consumer may decide to purchase a table because the table's dimensions, as included in the item listing, would fit in the consumer's dining room space. However, when the table arrives at the consumer's home, the table actually measures to be larger than the dining room space and therefore may need to be returned. The consumer may be less inclined to trust information provided by the retail environment because the consumer may not be certain whether that information is in fact accurate. Thus, the consumer may have lower expectations and confidence in the retail environment, resulting in reduced sales. The As another example, a consumer may decide to return a table by shipping it back to the retail environment. If the retail environment is aware of incorrect packaging dimensions for the table, the retail environment can incur higher return shipping costs because of such inaccurate dimensions. Additionally, this return can consume additional shipping resources, such as fuel. The disclosed techniques, therefore, can provide for identifying inaccuracies in the table's dimensions (e.g., packaging dimensions) so that the retail environment may cover correct return shipping costs. Similarly, identifying inaccuracies in the packaging dimensions can assist consumers to accurately determine whether to expect the item in a mailbox or a front step. If the item is substantially larger than expected, this may change a fulfillment method that the consumer would select.

Moreover, the disclosed techniques can reduce carbon footprint, a number of trucks or other vessels needed to ship items, and also improve efficiency of item delivery. If item dimensions are accurate more often, then relevant stakeholders in the supply chain may not need to reserve as many resources as they may reserve when item dimensions are less frequently correct. Thus, resources, including but not limited to storage space, number and type of shipment vessels, and/or other packaging items may be used more efficiently with the disclosed techniques.

In some implementations, outlier status, as determined using the disclosed techniques, may indicate that an item's dimensions are actually correct but that the item is incorrectly classified as being stored. Such identifications can improve systems throughout the supply chain by flagging incorrectly classified items to be properly classified early in the supply chain.

Additionally, using multiple machine learning trained models can improve accuracy in predicting items in an item category that have inaccurate item dimensions. The models' outputs can be compared to each other to determine a majority output of the models and therefore a more accurate prediction of inaccuracy in item dimensions. The models may also be continuously trained in a feedback loop using output from the models as well as a validation process that includes determining prediction deviations of the models relative to each other. Multiple models utilizing different approaches can be applied to items dimensions data to more accurately predict inaccuracy of dimensions. Using a majority voting rule with the disclosed techniques, an item can be accurately identified as an outlier in need of additional inspection and updating of the item's dimensions data. Thus, predictions to identify outliers can be made accurately by using the disclosed techniques.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
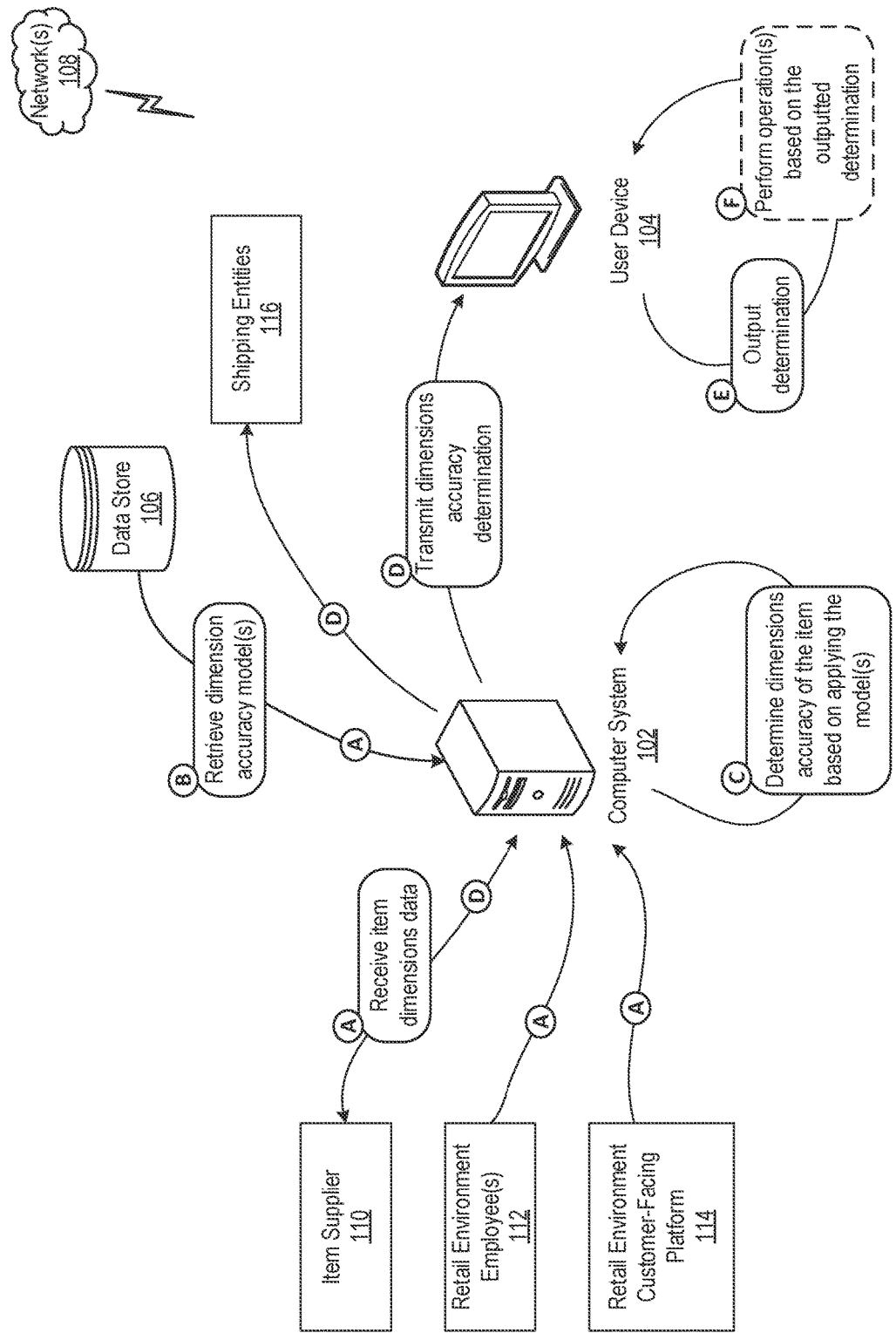
FIG. 1 is a conceptual diagram for determining item outliers based on item dimensions data.

This document generally relates to systems, methods, and techniques for identifying incorrect item dimensions. In other words, reported and/or collected item dimensions data can be assessed and compared to typical/expected dimensions for similar items (e.g., items in a same item category) to identify outliers. The disclosed techniques may help determine situations in which item dimensions for particular items are inaccurate and should be updated. Machine learning techniques can be used to accurately identify inaccuracies. Identifying inaccurate item dimensions and improving them can be beneficial to improve order management, reduce returns or other shipping logistic costs, and improve guest expectations. Thus, identifying and correcting inaccurate item dimensions data can help improve item descriptions and placement and shelving (e.g., items can be placed on shelves that are appropriately sized rather than potentially placed on shelves based on inaccurate item dimensions data) of items in warehouses, distribution centers, other facilities, and/or retail environments (e.g., stores). As described herein, item dimensions data refers to actual item size and item package dimensions.

The disclosed techniques can provide an ensemble model that can be trained using machine learning techniques to predict whether a given item's dimensions are erroneous.

The ensemble model can be a combination of multiple machine learning trained models with majority voting to identify outliers. As an example, an item can be flagged as an outlier if 3 or more of the 5 models indicate the item as an outlier. The multiple machine learning trained models can be executed in parallel. Output from each of the models can be compared using a voting scheme to determine a majority of the models output (e.g., accurate item dimensions or inaccurate item dimensions). The majority output can then dictate whether the item dimensions are in fact inaccurate. Using multiple models in the ensemble model can be beneficial to ensure accuracy in predictions.

The ensemble model can be implemented using outlier detection methodology. Outliers are extreme values that deviate from other observations in a dataset. Outliers may indicate a variability in measurement, a novel observation, and/or incorrect data. In other words, outlier detection includes identification of rare items, events, and/or observations. An outlier detection methodology can therefore be used to identify outliers as items having incorrect and/or anomalous item dimensions data. Item dimensions data and item type can be used as inputs to output predictions of dimensions inaccuracies. Outlier detection can be performed within each item type of item category. For example, all items that are of "dining chair" type can be modeled and assessed together while all items that are of "book" type can be modeled and assessed relative to each other. Item type can be a granular level of item taxonomy, which can be used to avoid comparing items that are expected to have different dimensions data, such as the dimension of a book to those of a dining chair. In some implementations, the items can be grouped and assessed using one or more branches in the items' taxonomy, such as merchandise type, product sub-type, and/or product type.

The ensemble model described herein can be used to automatically flag items having dimensions that are outliers. The automatic flagging can occur during one or more different stages of the supply chain lifecycle. For example, automatic flagging may occur when items are set up or updated in a retail environment's data ecosystem (e.g., data store, inventory management systems, etc.).

Relevant stakeholders in the supply chain can be notified of items that are flagged for inaccurate item dimensions. The relevant stakeholders may then take action to check and/or correct the item dimensions. For example, a worker in the distribution center, warehouse, or other facility can physically inspect the item and measure its dimensions, compare those measured dimensions to those in the retail environment's data ecosystem, and validate or update the dimensions in the data ecosystem. As another example, an automated systemic check can be performed to check, validate, and/or update the dimensions of an item in the data ecosystem. As yet another example, an item supplier, vendor, and/or manufacturer can be contacted and asked to provide updated item dimensions. One or more other actions are also possible.

Predictions made by any of the multiple models as well as actions taken in response to items being flagged can be used in a continuous feedback loop to train the multiple models and improve their accuracy in predicting inaccurate item dimensions.

Referring to the figures, FIG. 1 is a conceptual diagram for determining item outliers based on item dimensions data. A computer system 102, a user device 104, and a data store 106 can communicate (e.g., wired and/or wireless) via network(s) 108. In some implementations, one or more of the computer system 102, the user device 104, and the data store 106 can be part of a same system, network of computers/devices, cloud-based system, and/or cloud-based service. In some implementations, the computer system 102 can be deployed across multiple retail environments (e.g., stores) and/or distribution centers, warehouses, or other types of facilities. In some implementations, each retail environment can have its own computer system 102.

The computer system 102 can receive item dimensions data (step A) from one or more sources. The sources can include but are not limited to an item supplier 110, retail environment employee(s) 112, retail environment customer-facing platform 114, and/or the data store 106. The sources can also include a global data syndication system, which can be an item data standards organization that centralizes item data for multiple retailers or other relevant users in the supply chain. The sources may also include automated scanning machines that measure item dimensions in a retail environment, distribution center, warehouse or other facility.

As described herein, the item dimensions data can include height, width, depth, and/or weight of the actual item and/or the item package. The item dimensions data can be transmitted to the computer system 102 upon request from the computer system 102. This data can also be automatically transmitted to the computer system 102 at predetermined time intervals (e.g., once every day, 2 times a day, etc.). In some implementations, the item dimensions data can be transmitted to the computer system 102 when that data is updated or otherwise logged/created by or at one or more of the sources.

The item supplier 110 can be a supplier, vendor, manufacturer, or other relevant third party in the supply chain for the particular item. The item supplier 110 can maintain a computer system and/or data repository (e.g., data store) that includes information about each of the items provided by that supplier 110. For example, the item supplier 110 can log, in the data repository, height, depth, width, and/or weight information for each item. This dimensions data can be manually inputted into the data repository based on physical inspection of the items by a worker. This data can also be automatically inputted into the data repository based on automatic, systemic inspection of the items by a computer system, robotic device, or other system/device.

The retail environment employee(s) 112 can be human workers in the retail environment, warehouse, distribution center, or other facility. The employee(s) 112 can have user devices, such as the user device 104, that can be used to input information about items in the retail environment, warehouse, distribution center, or other facility. For example, an employee 112 can walk around a distribution center and physically inspect and measure dimensions of items. The employee can input the measured dimensions into an application or other software presented at the user device 104. The inputted dimensions can then be transmitted to the computer system in step A.

The retail environment customer-facing platform 114 can be a website, web page, mobile application, or other software presented to customers, such as end consumers. The platform 114 can provide the customers with listings of items for sale in the retail environment. The listings can include details and information about the item that can be used by the customers to make purchase decisions. For example, the listings can include information such as price, discounts, detailed descriptions, reviews, and dimensions data (e.g., height, width, depth, and/or weight). In step A, the computer system 102 can request an item listing from the retail environment customer-facing platform 114. The computer system 102 can receive the item listing and can extract dimensions data from the item listing to be used in the techniques described herein. In some scenarios, the dimensions data for an item can be accurately stored in the data store 106 but may not be accurately replicated in the retail environment customer-facing platform 114. Thus, by receiving the dimensions data directly from the platform 114, the computer system 102 can determine whether accurate dimensions data is being presented to customers and/or whether the dimensions data should be updated in the item listing.

As described herein, the computer system 102 can also receive the item dimensions data from the data store 106 in step A. For example, item dimensions data can be received from one or more of the item supplier 110, the retail environment employee(s) 112, and the retail environment customer-facing platform 114. This item dimensions data can then be stored in the data store 106 with other information about the associated item. The computer system 102 can then retrieve this item dimensions data from the data store 106 at a later time, when the computer system 102 is predicting item dimensions data accuracy.

The computer system 102 can also retrieve one or more dimension accuracy models from the data store 106 (step B). As described herein, the computer system 102 can retrieve five machine learning trained models, which can be trained to predict whether an item is an outlier in a particular item category based on the item's dimensions data. Majority voting techniques can then be used by the computer system 102 to designate the particular item as an outlier or an inlier. The models can include principle component analysis (PCA), isolation forest (ISO), minimum covariant determinant (MCD), maximum z-score by dimension (MSTD), and maximum median absolute distance (MMAD). As described herein, these models can be executed in parallel to assess and predict accuracy of item dimensions data received in step A.

Accordingly, as mentioned above and described further below, the computer system 102 can determine dimensions data accuracy of the item based on applying the models (step C). The computer system 102 can then transmit the dimensions accuracy determination to one or more systems and/or devices (step D). The dimensions accuracy determination can be an indication of whether the item is an outlier or an inlier based on the majority vote of the applied models. The dimensions accuracy determination can also include all outputs of the applied models (e.g., 5 predictions of item dimensions data accuracy). In some implementations, the dimensions accuracy determination can include a list of items that are identified as outliers. The dimensions accuracy determination can also include suggested operations that can be performed to check and/or update the item dimensions data.

The computer system 102 can transmit the determination to the user device 104. The computer system 102 can also transmit the determination to computing systems operated by or otherwise associated with shipping entities 116 and/or the item supplier 110. The user device 104 can be a mobile phone, laptop, tablet, and/or computer of a retail environment employee or another relevant user in the supply chain. For example, the user device 104 can be used by a worker in the distribution center who is tasked with checking items as they enter the distribution center and once they are stored in the distribution center. The shipping entities 116 and include shipping companies and other relevant third parties who can determine shipping costs and schedules. The shipping entities 116 can use the dimensions accuracy determination to identify appropriate shipping costs, methods, and/or schedules for the item. For example, the shipping entities may have automated computing systems for determining appropriate shipping costs and reserving shipping resources based on received item dimension data. This can include selection of appropriately sized shipping containers (e.g., boxes) and shipping vehicles. As a result, the retail environment may be charged shipping costs based on correct item dimensions data. The shipping entities 116 can also use the determination to identify efficiencies in filling available shipping space and shipping vessels. The item supplier 110 can use the dimensions accuracy determination from step D to determine whether item dimensions data should be or needs to be updated. The item supplier 110 can update the item dimensions data and transmit the updated data to the computers system 102. The updated data can then be stored in the data store 106 and/or used in the disclosed techniques.

The user device 104 can output the dimensions accuracy determination (step E). For example, the determination can be presented on a display screen, in a graphical user interface (GUI), to the user, such as a distribution center employee.

The user device 104 can optionally perform one or more operations based on the outputted determination (step F). In some implementations, the shipping entities 116 and/or the computer system 102 can perform step F. The item supplier 110 may also perform step F. The one or more operations can include requesting a retail environment employee to physically inspect the item and check the item's dimensions data. Sometimes, the dimensions accuracy determination can include an indication of which dimensions data should be checked/updated, which can assist the retail environment employee to more efficiently identify and address inaccuracies in the dimensions data. The one or more operations can also include requesting updated dimensions data from the item supplier 110. The request can be automatically transmitted to the item supplier 110. In some implementations, the request can be transmitted to the item supplier 110 upon instruction from the user at the user device 104 (e.g., via user input). The one or more operations can also include performing an automated systemic check to verify and/or update item dimensions data. One or more other operations can also be performed by the user device 104, the computer system 102, the shipping entities 116, and/or the item supplier 110 in step F.

Figure 2:
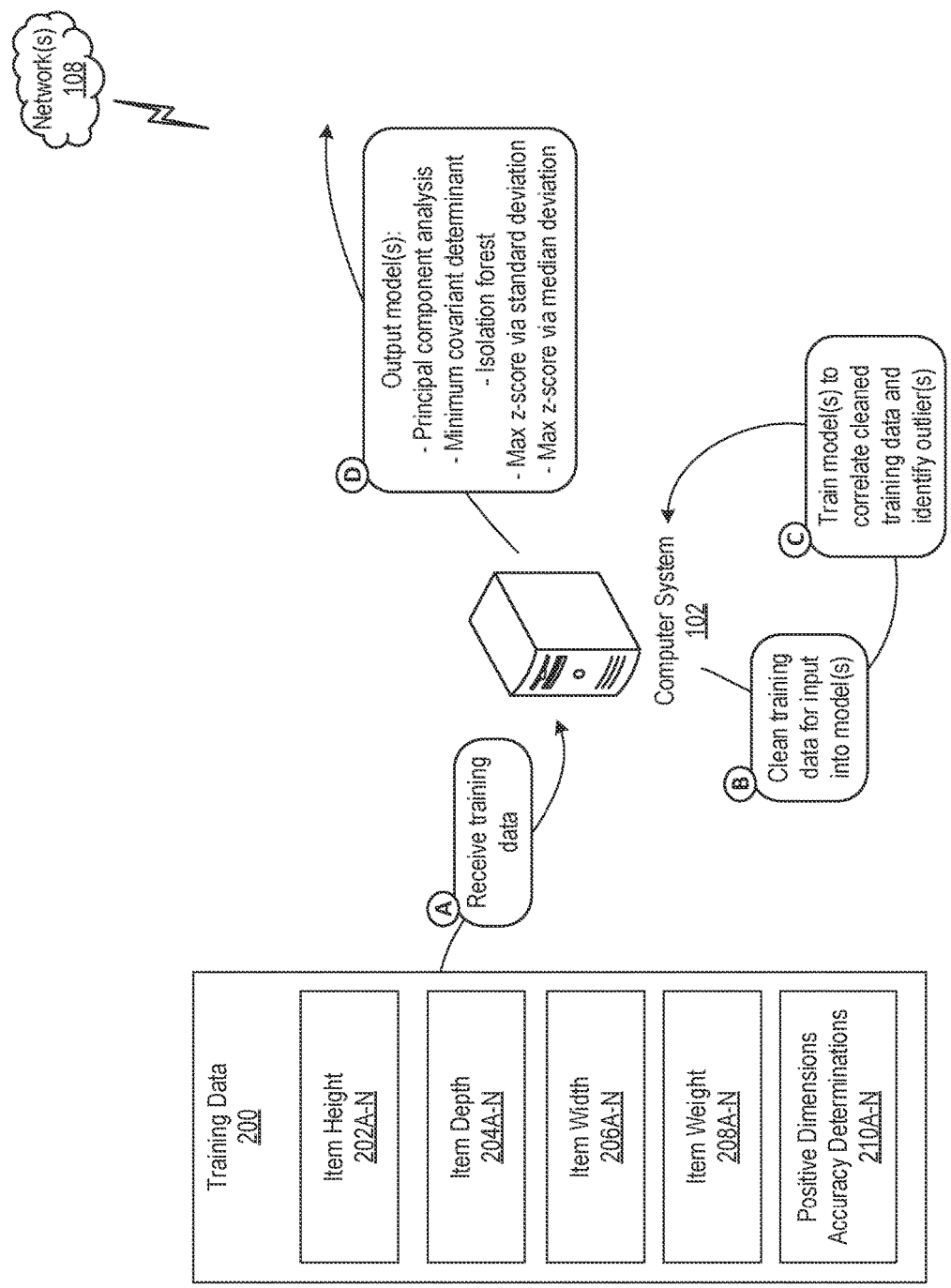
FIG. 2 is a conceptual diagram for training one or more models that can be used to identify item outliers based on item dimensions data.

FIG. 2 is a conceptual diagram for training one or more models that can be used to identify item outliers based on item dimensions data. Training can be performed by the computer system 102. Training can also be performed by one or more other computers, systems, and/or devices. For example, training can be performed by a remote computing system, a cloud-based system, and/or a cloud-based service. For illustrative purposes, training is described herein as being performed by the computer system 102.

Referring to FIG. 2, the computer system 102 can receive training data 200 (step A). The training data 200 can include information for known items, such as item height 202A-N, item depth 204A-N, item width 206A-N, item weight 208A-N, and positive dimensions accuracy determinations 210A-N. The training data 200 can be manually provided by a relevant user, such as a retail environment employee. The training data 200 can also be provided by relevant stakeholders in the supply chain, such as an item supplier (e.g., the item supplier 110 in FIG. 1). In some implementations, a subset of the height 202A-N, depth 204A-N, width 206A-N, and/or weight 208A-N can be accurate dimensions data. Another subset of the height 202A-N, depth 204A-N, width 206A-N, and/or weight 208A-N can be inaccurate dimensions data. Accurate and inaccurate dimensions data can therefore be used by the computer system 102 to train the models to accurately predict dimensions data that is inaccurate. The positive dimensions accuracy determinations 210A-N can also be used by the computer system 102 to validate the models and further improve/refine accuracy of such models. After all, the determinations 210A-N can be true determinations about whether item dimensions are accurate or inaccurate. Output from the trained models can be compared to the determinations 210A-N to determine a deviation of such output. The computer system 102 can use the determined deviation as part of validating and refining the models.

Still referring to FIG. 2, the computer system 102 can clean the training data 200 for input into the models in step B. Cleaning the training data 200 can include removing data that may not be effective in training the models to accurately predict inaccurate item dimensions data. For example, cleaning the data can include identifying data in the training data 200 that clearly is unreasonable and/or incomplete. Such identified data may not be provided as input to the models for training. Data might be unreasonable and/or incomplete if, for example, any of the dimensions are 0 (e.g., height, width, length, and/or weight). Data might also be considered unreasonable and/or incomplete if the data has no value (e.g., null). Data might also be considered unreasonable and/or incomplete if the height, width, and depth are 1×1×1. Data may be considered unreasonable and/or incomplete if the dimensions exceed one or more predetermined threshold values. For example, depth, width, or height that is equal to or greater than 150 inches can be considered unreasonable and/or incomplete. The data can be cleaned based on and using one or more other conditions or rules.

In some implementations, the data can be cleaned based on undersampling duplicates to one or more threshold ranges. For example, the threshold range can be 25 samples. In some item categories, there can be thousands of items having identical item dimensions data. This can create an imbalance, with a single duplicated sample dominating by 10-100× and thereby causing any item with different item dimensions to be flagged as an outlier. For example, an "Athletic Tops" item category (e.g., type) can have ~6,000 items but about 89% of those items can have the same height, depth, and width. Because of this, any deviation in the data by even a small amount can cause the models to classify the deviation as an outlier. Hence, cleaning the data can include undersampling the data to, at most, 25 duplicate samples. 25 duplicate samples can be beneficial so that heavier weighting on dimensions that are duplicated may not be disregarded but at the same time actual outliers can still be identified rather than flagging false positives due to a slight deviation.

Cleaning the data may also include requiring some quantity of total samples and another quantity of distinct samples per item category (e.g., type). As an illustrative example, the computer system 102 can require 20 total samples and 9 distinct samples per item category. One or more other quantities can also be used. 9 distinct samples can be chosen since some of the models (e.g., such as the MCD model) can perform less effectively when a matrix of sample data is not full rank. In an example where 6 features are modeled (e.g., width, depth, height, weight, volume, and density), 50% more distinct samples can be required than features in order to avoid collinearity. 20 total samples may also be used because any fewer may result in no items being flagged as outliers. Setting the contamination threshold for each model can be challenging if there isn't at least one outlying sample. Thus, 20 samples can enforce one outlying sample with the contamination threshold hyperparameter being equal to 2.5% (e.g., 20×0.025=0.5 outlier flagged).

The computer system 102 can then train the models to correlate the cleaned training data and identify outliers (step C). For example, the cleaned training data can be provided as input into the models. The positive dimensions accuracy determinations 210A-N can also be provided as input into the models for training. The models can be trained to correlate height, depth, width, and/or weight data with positive dimensions accuracy determinations to accurately identify when an item is considered an outlier in a category of similar items. Moreover, the models can be trained to clean the data during runtime. In other words, the models can be trained to automatically flag any item that satisfies at least one of the unreasonable and/or incomplete conditions mentioned above (e.g., one or more null item dimensions, one or more item dimensions that equal 0, height, width, and depth being 1×1×1, any dimension being equal to or greater than 150 inches, etc.). The unreasonable and/or incomplete conditions thus represent items that are either set up improperly or poorly and thus should be addressed/corrected.

The models can also be trained to compare dimensions data for items in a same category to determine if, and by how much, the dimensions data for a particular item deviates from expected dimensions data for items in the same category. For example, one or more of the models can be trained to generate data plots of dimensions (e.g., length, width, height, and weight) for each item in an item category. These data plots can then be compared to each other to identify outliers amongst the items.

The models can then determine, based on the determined deviation, whether the item is an outlier and thus has inaccurate dimensions data. The models can be trained to identify the item as an outlier if any of the dimensions data of that item exceeds some predetermined threshold range and/or value associated with the category of items that the item belongs to. The models can generate output having string, Boolean, and/or numeric values. For example, the output can be a numeric value indicating a likelihood that the item is an outlier (e.g., the item has inaccurate dimensions data). The numeric value can be on any desired scale, such as 0 to 100 (e.g., 0 being least likely to be an outlier and 100 being most likely to be an outlier). The output can be a string value indicating that the item is or is not an outlier. The output can also be a Boolean value such as True or Yes, thereby indicating that the item is likely an outlier, or False or No, thereby indicating that the item is likely an inlier. The models can also be trained to output one or more other values that can indicate whether the item is an outlier or inlier based on accuracy of the item's dimensions data.

A contamination threshold can also be selected prior to feeding dimensions data into any one of the models for training and also runtime use. Contamination is an expected proportion of outliers in the dimensions data and can be specified at a time of model fitting build. The contamination threshold can be used during fitting to define a threshold on the scores generated by the models, where those scores can indicate whether an item is an outlier.

The contamination threshold can be 2.5%. In some implementations, the contamination threshold can be 1%, 5%, or any other threshold values. As the contamination threshold increases (e.g., from 1 to 5%), a number of data points detected as outliers may also increase. At 1% contamination, for example, some outliers may not be detected by one or more of the models, while at 5% contamination, some inliers (e.g., accurate data points) may also be flagged erroneously.

Thus, at 2.5% contamination, all or most of the outliers can be flagged with relatively few false positives. Accordingly, the models can be trained to set the threshold so that 2.5% of items are outside of the threshold. In some implementations, the threshold can be set as outside 2 standard deviations. In yet some implementations, the threshold can be set as outside 3 standard deviations. Moreover, sometimes, the threshold can be set as outside a predetermined limit, such as 40% outside the norm for items in the same category of items.

Once training is complete in step C, the computer system 102 can output the models in step D. As described herein, the computer system 102 may continuously train the models. For example, the computer system 102 can validate output from training the models using the positive dimensions accuracy determinations 210A-N as a comparator. The computer system 102 can also further improve/refine the models based on feeding output from the models during runtime back into the models for training purposes. As a result, the models can be continuously improved to generate accurate predictions of item dimensions accuracy.

The computer system 102 can output more than one type of model. For example, the computer system 102 can output models for PCA, ISO, MCD, MSTD, and MMAD. Each of the models can be trained with the same training data 200. Each of the models can also be trained to identify outliers (e.g., predict item dimensions accuracy) using one or more of the same data inputs (e.g., height, width, length, and/or weight). Although the models can use the same data inputs, each model can process the data inputs differently. For example, one or more of the models can process each of the data inputs separately. As another example, one or more of the models can process the data inputs collectively.

The PCA, ISO, and MCD models can be trained to detect outliers from multivariate data. The MSTD and MMAD models can be trained to detect outliers from univariate data. Several different models can be used, as described herein, because some items may only have one incorrect dimension while other items may require that all their corresponding dimensions be compared holistically. Each of the models also may have different strengths, so combining their output via a majority voting strategy can enable capturing these varied strengths in a more accurate identification of outliers.

Principle component analysis (PCA) provides an aggregated univariate approach. PCA is a linear dimensionality reduction technique that can be used to project data into a lower dimensional space. Outlier scores can be obtained as a sum of a projected distance of a data point onto the principal components. Thus, when projected points deviate significantly in a direction of small components, the points tend to be indicative of outliers. Each vector in multi-dimensional space can represent principal components. Such vectors can be shifted such that their tails are at a center of the modeled data. Using PCA for outlier detection can indicate that some points are more likely to be outliers than other points, even if those points are closer to a center of all the data. With PCA, there may be no distribution assumption.

Accordingly, PCA can be used to calculate deviation in each direction relative to a component magnitude. Each components can be a different dimension. For example, there can be 4 components for an item and thus 4 dimensions. The 4 components can be item height, width, depth, and weight. PCA can aggregate deviations in each direction relative to the component magnitude to determine an outlier score. The outlier score can be a binary value (e.g., Yes for accurate dimension and No for inaccurate dimensions). The outlier score can also be a numeric value on some predefined scale (e.g., 0 being least likely accurate dimensions and 100 being most likely accurate dimensions).

Isolation forest (ISO) can be a multivariate approach with no distribution assumption. ISO can provide for calculating an outlier score based on a number of cuts or breaks that are made to an isolate sample. As a tree ensemble method, ISO can be built from a basis of decision trees. In these trees, partitions can be created by first randomly selecting a feature and then selecting a random split value between minimum and maximum values of the selected feature. This process can be continued until a single point is isolated and/or a specified maximum depth is reached. Through this splitting method, outliers can have a shorter average path length, where path length can equal a number of edges an observation must pass in the tree going from root to terminal node. A normal point (e.g., an inlier) can therefore require more partitions to be isolated than an outlier.

Minimum covariant determinant (MCD) can also be a multivariate approach. MCD can identify a fraction of data with a smallest variation and can thus be used to measure variation in data. This approach can be used to find a subset of data whose enveloping ellipse has a minimal covariance, a multi-dimensional measure of a size of the ellipse. Thus, this approach can find the smallest subset of the data. This approach can be used to identify outliers because those data points would fall further away from a center of this ellipse. Additionally, since MCD can be fit on a subset of the data, this approach may not be influenced heavily by outliers and thus can more accurately measure distance to outliers. The MCD can focus on a tightest collection of data points. A proportion of the chosen subset to the entire set of data can be a significant hyperparameter for this model, which can be called the support fraction. An example support fraction can be 0.85, indicating that the model can train on most of the existing data, but may ignore the more extreme data points.

Maximum z-score by dimension (MSTD) can be a univariate approach and thus applied separately to each variable. The variables may include each of the item dimensions, including but not limited to width, height, depth, and weight. MSTD also may assume normal distribution. For each feature (e.g., weight, height, width, depth, volume, density), a z-score can be calculated. The z-score can indicate a number of standard deviations above or below the mean. The maximum of the absolute values of these standard deviations can then be determined. This can be considered a monovariate approach (e.g., applied to multiple variables at once) to outlier detection while above three mentioned models may not. The MSTD model can be beneficial to include in the disclosed techniques because there can be items with only a single dimension that may be incorrect and that alone may not be sufficient for the other models to flag that item as an outlier.

Maximum median absolute distance (MMAD) can also be a univariate approach and applied separately to each value. MMAD may not assume normal distribution. This model is similar to MSTD, with the difference being how the center value and deviation are calculated. In MSTD, the center value can be the mean and the deviation can be standard deviation. For MMAD, the center value can be the median and the deviation can be the median deviation, defined as the median of absolute differences of every point from the median. Using median and median deviation, the MMAD approach can provide for calculating a median z-score as the number of median deviations from the median. Like standard deviation, this is a monovariate concept, which can be extended to a multivariate case by taking a maximum of the median z-scores across all features (e.g., weight, height, depth, width, volume, density, etc.).

The models can be validated using one or more techniques, as described throughout this disclosure. For example, incorrect and correct dimensions can be identified (e.g., by workers in the retail environment and/or automatically, such as by the computer system 102). Predictions made by each of the models can then be evaluated against the identified incorrect and correct dimensions. Thus, deviations in prediction accuracy can be determined and then compared across all of the models. The models can be further refined and trained based on one or more validation techniques to improve accuracy in predicting incorrect versus correct item dimensions.

For example, a list of inliers (e.g., 141 items) and outliers (e.g., 64 items) can be created (e.g., automatically or manually) to use for validation. These items can be selected by hand, for example, by manually looking at each item's dimensions and using primarily intuition as to whether the item dimensions are valid. Results from the models can also be used to help generate these lists. These lists can then be used to measure recall for the models by using these two lists as holdout sets and thus finding false and true positives by comparing the model predictions against the two lists. Standard classification metrics of recall, precision, and f1 score can also be determined using these lists. Classification metrics can be used to measure performance even though each model can be performing unsupervised classification.

Figure 3:
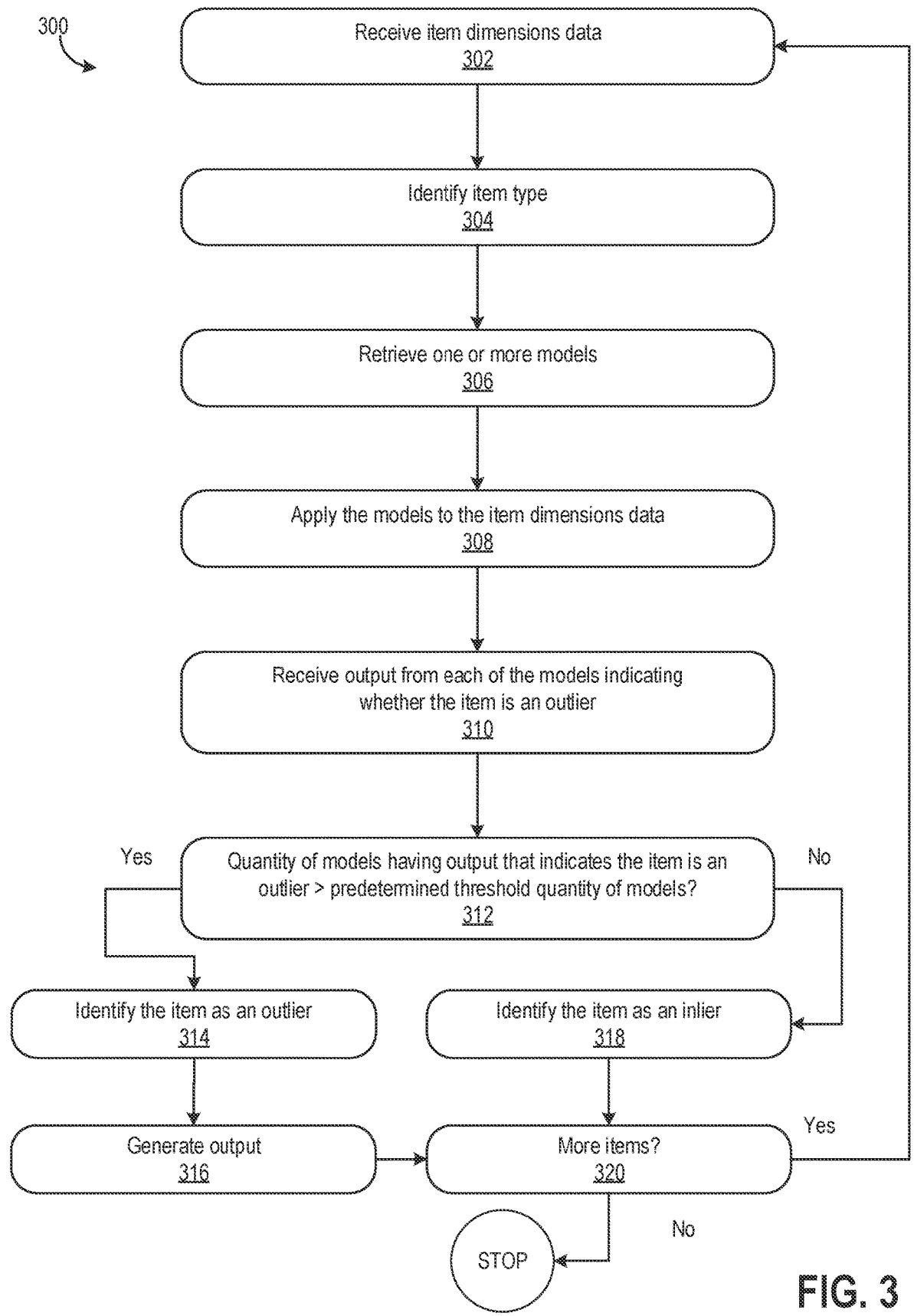
FIG. 3 is a flowchart of a process for determining item dimensions accuracy using one or more machine learning trained models.

FIG. 3 is a flowchart of a process 300 for determining item dimensions accuracy using one or more machine learning trained models. The process 300 can be performed by the computer system 102. The process 300 can also be performed by one or more other computing systems, devices, computers, networks, cloud-based systems, and/or cloud-based services. For illustrative purposes, the process 300 is described from the perspective of a computer system.

Referring to the process 300, the computer system can receive item dimensions data in 302. Refer to step A in FIG. 1 for further discussion.

The computer system can identify an item type in 304. In some implementations, the data received in 302 can include an item type, which can also be referred to herein as an item category. In some implementations, the computer system can determine the item type for the particular item based on the dimensions data received in 302. For example, the data can include an identifier (e.g., barcode, SKU) associated with the item. The computer system can perform a lookup function in a data store (e.g., the data tore 106) to identify what item type the identifier is associated with. The item type can be any one or more categories for classifying items in a retail environment. For example, the item type can be as granular as office chair, dining chair, sofa, loveseat, king size mattress, children's desk, dining room table, books, cellphones, laptops, etc. As described herein, each item can be assessed relative to other items of a same/similar type/category. Such a comparison can more accurately indicate when an item is an outlier relative to other items of the same/similar type based on dimensions data.

In 306, the computer system can retrieve one or more models. The models can be stored in and accessed from a data store, such as the data store 106. 306 can be performed before, during, or after 302 and/or 304. In some implementations, the models may be stored locally at the computer system (e.g., in RAM) and therefore the computer system may not have to retrieve the models from the data store. In some implementations, the models can be packaged in an ensemble model. The ensemble model can include individually trained machine learning models, such as PCA, ISO, MCD, MSTD, and MMAD models described throughout this disclosure. In other implementations, the computer system can retrieve each of the individual models.

The computer system can apply the models to the item dimensions data in 308. As described in reference to FIGS. 1-2, the item dimensions data can be provided as input into the models. The models can be trained to predict accuracy of the item dimensions data based on a comparison of the item dimensions data to dimensions data of other items of the same/similar item type.

Accordingly, the computer system can receive output from each of the models indicating whether the item is an outlier (310). Each of the models can generate output indicating a likelihood that the item dimensions data is accurate. If the data is inaccurate, or has a high likelihood of being inaccurate, a model can generate output indicating that the item is an outlier, or is likely an outlier. The output, as described herein, can be string values, Boolean values, and/or numeric values.

Next, the computer system can determine whether a quantity of the models having output that indicates the item is an outlier exceeds some predetermined threshold quantity of models (312). In other words, the computer system can perform a majority vote. If 3 of the 5 models generate output indicating that the item is an outlier, or likely is an outlier, then the computer system can determine that the item is an outlier relative to items of the same/similar type, or is likely an outlier, and should be checked/updated. If less than a majority of the models generate output indicating that the item is or likely is an outlier, then the computer system can determine that the item is an inlier relative to items of the same/similar type. In other examples, an item will be identified as an outlier only if a super majority of 4 out of 5 models generate output indicating that the item is an outlier, or likely is an outlier. As another example, an item will be identified as an outlier if at least 2 out of 5 models generate output indicating that the item is an outlier, or likely is an outlier.

One or more other standards/rules/conditions can be used to determine whether the item is in fact an outlier or likely an outlier based on output of the models. As an illustrative example, the computer system can find an average of the output from the models and determine whether the average exceeds a predetermined threshold value. If the averaged output exceeds the predetermined threshold value, the computer system can identify the item as or likely to be an outlier. If, on the other hand, the averaged output is less than the predetermined threshold value, the computer system can identify the item as or likely to be an inlier. One or more other standards/rules/conditions can also be employed by the computer system.

In some implementations where the models are part of the ensemble model, the ensemble model can be trained to take the output of the models as input and generate output indicating whether the item is in fact an outlier or is likely to be an outlier. The ensemble model can be trained, for example, to identify a majority vote of the models and identify the item according to the majority vote. One or more other standards/rules/conditions can be used by the ensemble model.

Thus, as described above, if the quantity of models having output that indicates the item is an outlier exceeds the predetermined threshold quantity of models, the computer system can identify the item as an outlier (314). The computer system can generate output based on this identification (316). For example, the output can include an indication to be presented at a user device (e.g., the user device 104) of a user such as a retail environment employee. The indication can prompt the user to review the dimensions data that is provided via the computer system to determine if they think the dimensions are correct or not. The indication can also prompt the user to physically inspect the particular item in the retail environment, warehouse, distribution center, or other facility. The indication can also include information about which item dimensions should be checked, verified, and/or updated by the user. By flagging the item as an outlier and requesting additional physical inspection of the item, the user and/or the computer system can determine whether the outlier status is attributed to the item actually being an outlier or whether the outlier status is attributed to the item dimensions data being incorrectly inputted and recorded in the data store and overall computer system/ecosystem of the retail environment. Thus, outlier status may indicate that the item's dimensions data is actually correct but that the item is incorrectly classified in the overall computer system/ecosystem. Flagging of the item as an outlier can therefore prompt correction of the item classification for the item (e.g., through manual entry of a new classification by an employee or by eliciting corrected item classification information from a computing system of a supplier for the item).

The indication can also suggest, to the user, to contact an item supplier (e.g., the item supplier 110) and requesting updated item dimensions data from the item supplier. In some implementations, the output can be an automated message or notification that is sent to the item supplier requesting updated dimensions data. The indication can also suggest, to the user, to begin an automated systemic check of dimensions data for the particular item. In some implementations, the output can be instructions that, when executed, cause the computer system, or another computer or device, to automatically perform the systemic check. One or more other output can be generated in 316. The computer system can then proceed to 320.

Referring back to 312, if the quantity of models having output that indicates the item is an outlier is less than the predetermined threshold quantity of models, the computer system can identify the item as an inlier (318). In other words, the item dimensions data may be sufficiently similar/same to dimensions data of other items of the same/similar type. The item dimensions data may not require being checked, verified, or otherwise updated at the present time.

The computer system can then determine whether there are more items to check in 320. If there are more items, the computer system can return to 302 and repeat the process 300 for each remaining item. If there are no more items, the process 300 can stop.

The process 300 can be performed at predetermined time intervals. For example, the process 300 can be automatically performed/executed every day, at one or more predetermined times per day. The process can also be automatically performed/executed at other time intervals, such as once a day every day, once a day every other day, once a day every three days, etc. In some implementations, the process 300 can be performed when item dimensions data is added to the computer system/ecosystem (e.g., received from the item supplier 110, the retail environment employee(s) 112, and/or the retail environment customer-facing platform 114), when any of the item dimensions data is updated and/or removed, when a new item listing is created, and/or when a retail environment employee requests item dimensions data to be checked for accuracy.

Sometimes, historic dimensions data can be stored for items and compared to newly provided/updated dimensions data for the items. The computer system can compare the historic data to the new data and, for example, if the historic data defined a particular item as an inlier and the new data defines the particular item as an outlier, the computer system can flag the particular item so that the dimensions data is not changed from the historic data. In other words, the new dimensions data may not be stored and used as the dimensions data for the particular item.

Figure 4A:
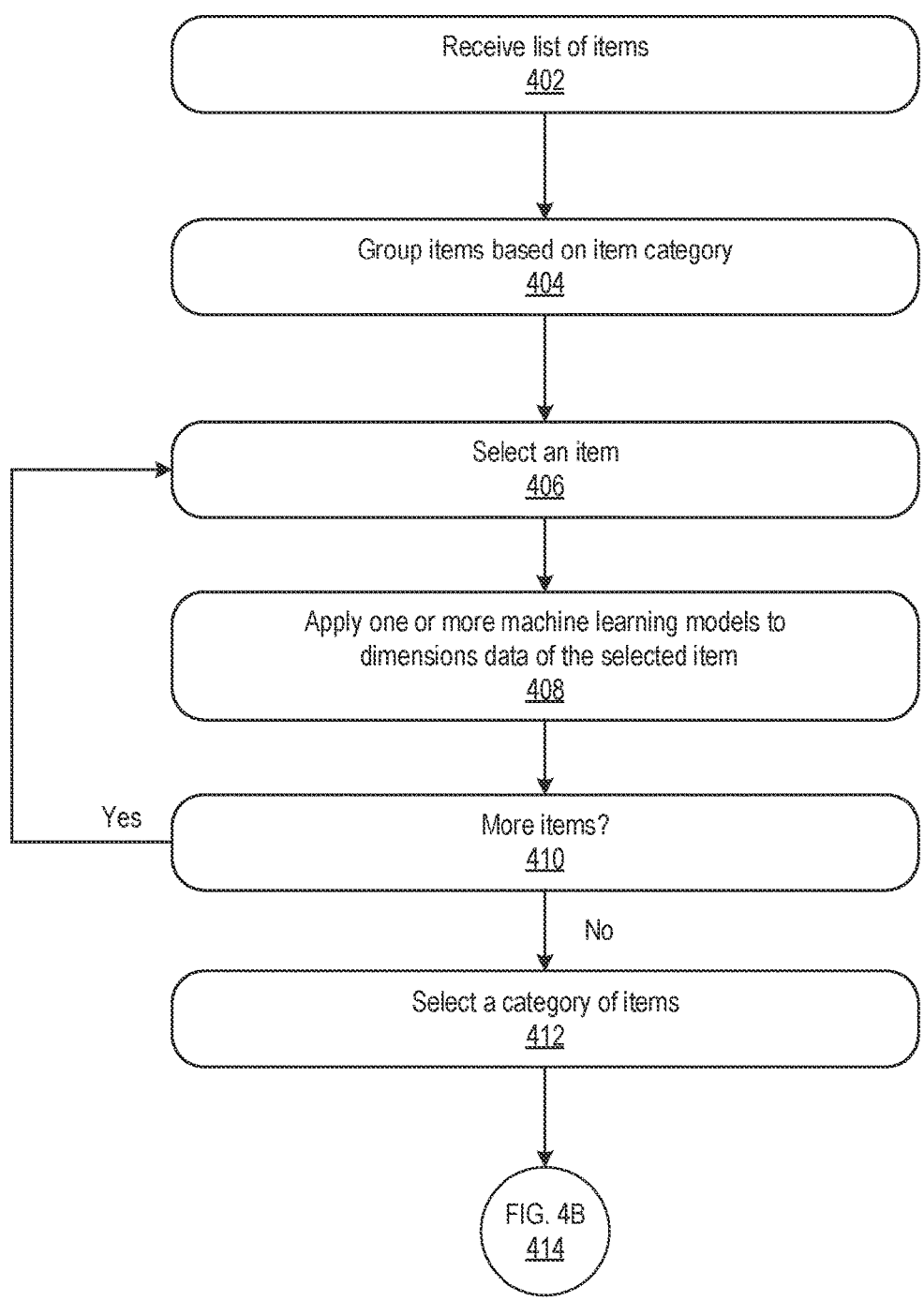
FIGS. 4A-B is a flowchart of a process for determining item outliers in a category of similar items based on dimensions data.
Figure 4B:
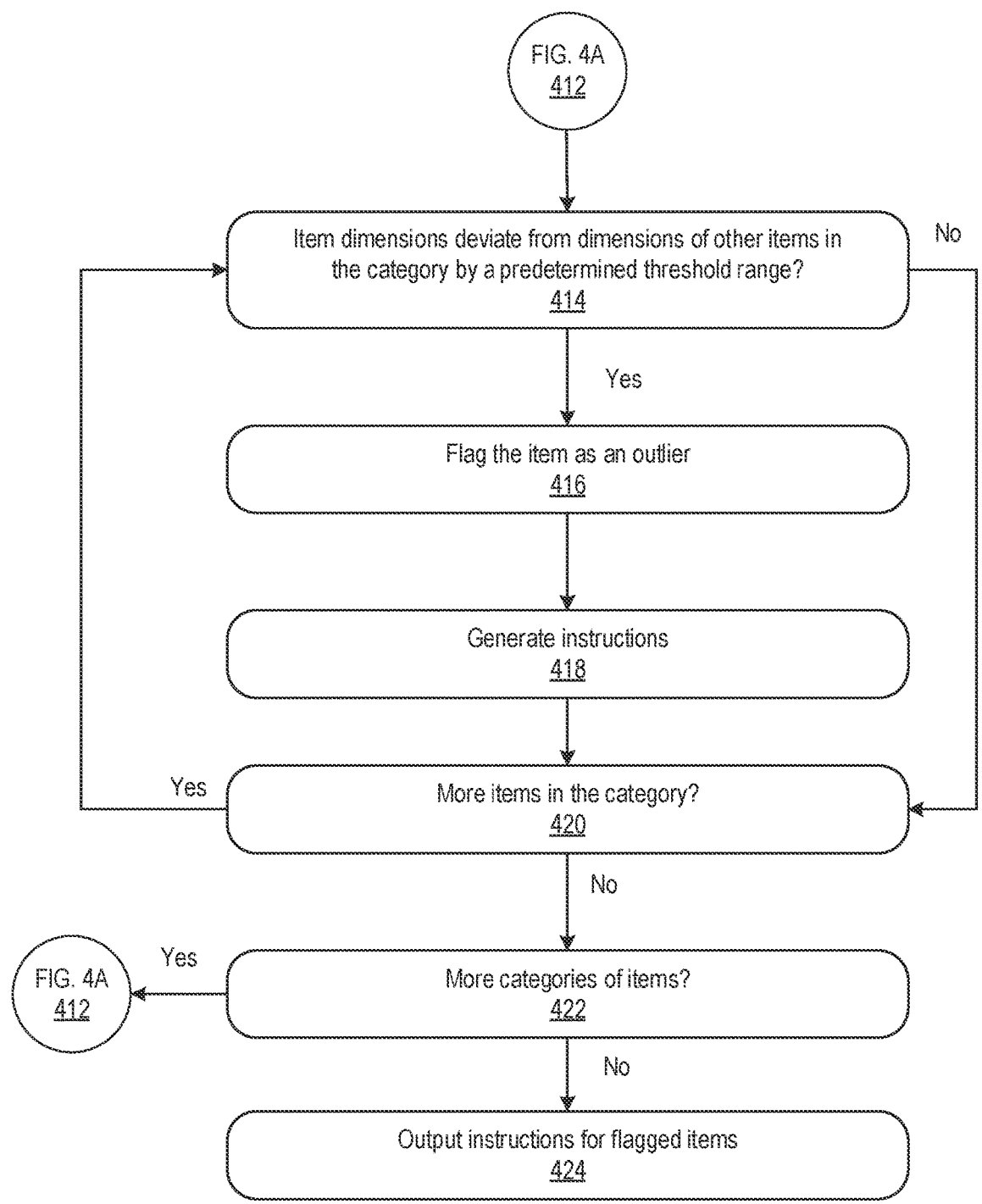

FIGS. 4A-B is a flowchart of a process 400 for determining item outliers in a category of similar items based on dimensions data. The process 400 can be performed by the computer system 102. The process 400 can also be performed by one or more other computing systems, devices, computers, networks, cloud-based systems, and/or cloud-based services. For illustrative purposes, the process 400 is described from the perspective of a computer system. Moreover, as described above in reference to the process 300, the process 400 can be performed at one or more predetermined time intervals. The process 400 can also be performed whenever new items dimensions data is provided to the computer system and/or stored or whenever items dimensions data is updated.

Referring to the process 400 in both FIGS. 4A-B, the computer system can receive a list of items in 402. The computer system can receive a list of items that have recently been updated with new or revised dimensions data. The list of items can also include new items that have been added to a retail environment. In some implementations, the list of items can also include all items or a subset of items in the retail environment, regardless of whether such items have been updated with new or revised dimensions data. The list of items can be retrieved from a data store, such as the data store 106. The list of items can also be automatically transmitted to the computer system from the data store or another computing system or device, such as a user device (e.g., the user device 104) of a retail environment employee.

The computer system can group the items based on item category (e.g., type) in 404. Refer to FIG. 3 for additional discussion. Next, the computer system can select an item in 406. In 408, the computer system can apply one or more machine learning models to dimensions data of the selected item to determine whether the selected item is an outlier, as described in reference to FIG. 3. As described herein, the computer system can apply an ensemble model that includes multiple machine learning models. The computer system can also apply each of the multiple models individually to the item dimensions data. The models can be applied in parallel. The models can be applied to the same dimensions data, however each model can process and analyze the data differently. For example, some models, as described in FIG. 2, can process each data (e.g., height, width, depth, weight, volume, density, etc.) individually while other models can process one or more data collectively.

The computer system can then determine whether there are more items in 410. If there are more items, the computer system can return to 406 and repeat 406-410 for each of the remaining items in the list of items. If there are no more items, the computer system can proceed to 412, in which the computer system selects a category of items.

The computer system can determine whether the item dimensions deviate from dimensions of other items in the category by a predetermined threshold range (414). This determination can be made by the ensemble model described herein. For example, each of the models can generate output indicating a likelihood that the item is an outlier amongst items in a same category. Outlier items can be identified as those having dimensions that deviate from dimensions of other items in the category by the predetermined threshold range. In some implementations, this determination can also be made by the computer system based on comparing output (e.g., changes in item dimensions) from each of the models.

The computer system can determine if, on a model-by-model basis, the dimensions of the item deviates from the other items in the category by the predetermined threshold range. The computer system can then employ a voting rule to determine a majority ruling of this determination. For example, if the item deviates from the other items in the category based on output from 3 of the 5 models, then the computer system can determine that the item is likely an outlier. In some implementations, the computer system can average the output from the models. The computer system can then compare the item to other items using the average output per item.

One or more predetermined threshold ranges can be used. These ranges can be dynamically determined based on one or more factors, including but not limited to the item category, any one or more of the dimensions data, the type of models used, and/or relativity of the dimensions data of other items in the same category. For example, if the dimensions data for a subset of the items in the same category is substantially similar, then any dimensions data of other items that does not align with or match the dimensions data for the subset of the items can cause the other items to be identified as outliers. In some implementations, the predetermined threshold range can be one or more values, including but not limited to 1% deviation, 2.5% deviation, 5% deviation, 7% deviation, 10% deviation, etc.

In some implementations, the computer system can determine that one or more items are outliers based on ranking the output from the models for the items in the category and identifying a predetermined quantity of the items that are outside predetermined threshold ranges for the dimensions data that is expected for the category. For example, any items in top 15% of the ranking that have dimensions data outside of a predetermined threshold range can be identified as outliers. As another example, any items in the category that deviate by a predetermined threshold value from a median or average dimensions data for the category can be identified as outliers. One or more other thresholds, rules, and/or conditions can be used to differentiate inliers from outliers in a category of items.

If the dimensions of the item do not deviate from the dimensions of other items in the category by the predetermined threshold range, the computer system can proceed to 420, discussed further below. If, on the other hand, the dimensions of the item deviate from the dimensions of other items in the category by the predetermined threshold range, the computer system can flag the item as an outlier in 416. In other words, the dimensions data of the item is not similar enough to dimensions data of other items in the same item category. The item can be flagged as an outlier because it may have inaccurate dimensions data.

The computer system can generate instructions according to the flagging (418). As described throughout this disclosure, the instructions can include contacting a supplier, requesting physical inspection of the item, performing automated systemic checks, etc. The instructions can also indicate what particular dimensions data of the item can and/or should be checked/updated. The instructions can be sent to the user device of a relevant user, such as a retail environment employee. The instructions can also be sent to one or more other computer systems and/or devices, such as an automated systemic checking system, item suppliers, shipping entities, etc.

Next, in 420, the computer system can determine whether there are more items in the category. If there are more items in the category, the computer system can return to 414 and repeat 414-418 for each remaining item in the category. Thus, the computer system can assess each of the items in the category against the other items in the category to determine whether any of the items deviate from dimensions data for items in the category.

If there are no more items in the category, the computer system can determine whether there are more categories of items in 422. If there are more categories, the computer system can return to 412 and repeat 412-420 until there are no more categories of items. Thus, the computer system can identify outliers in each of the item categories. If there are no more categories, the computer system can output the instructions for the flagged items in 424. As described herein, the instructions can be outputted to any one or more relevant users, including but not limited to retail environment employees, item suppliers, and/or shipping entities.

In some implementations, one or more blocks in the process 400 can be performed for only item categories that have been updated with new/additional items and/or having items dimensions data that have been updated. For example, although there may be more item categories in 422, one or more of those item categories may not include updated/new items dimensions data. Those item categories may not be assessed using one or more of the steps in the process 400 described herein. In some implementations, one or more blocks in the process 400 can be performed once particular items are updated with new/revised dimensions data, regardless of what item categories those items are part of.

In some implementations, if one item's dimensions data is updated, changed, and/or new, the computer system may only perform blocks 408 and 414-418 for the particular item. As a result, the computer system can determine whether the particular item's dimensions data deviates beyond the predetermined threshold range for items in the same category. The computer system may not perform blocks 408 and 414-418 for every item in the same category. Rather, the computer system can perform blocks 408 and 414-418 for any item in the category that has updated, changed, and/or new dimensions data. This can provide for efficient processing to make fast determinations of whether an item is an outlier in the category of same/similar items.

Figure 5:
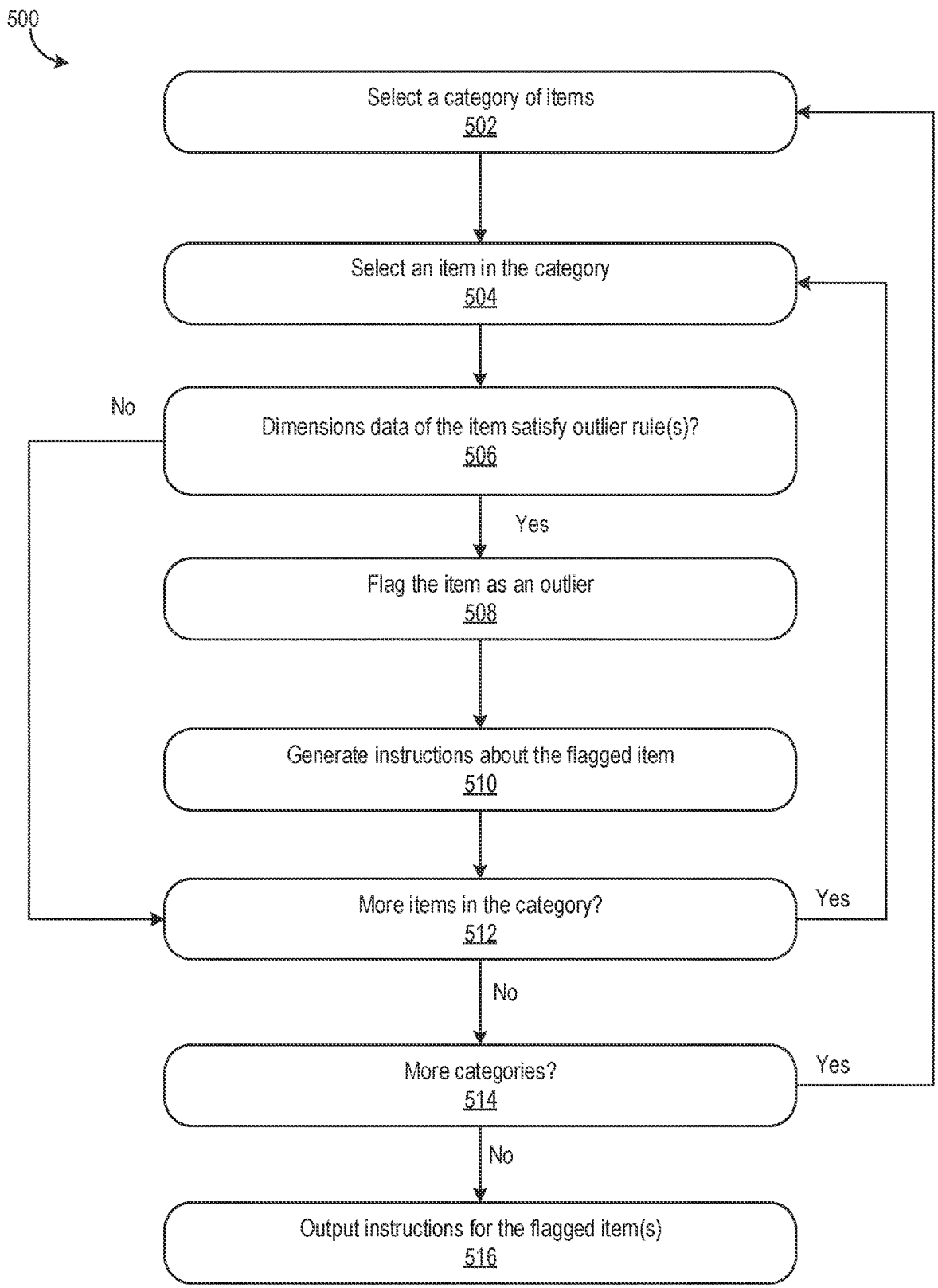
FIG. 5 is a flowchart of a process for determining obvious outliers based on dimensions data.

FIG. 5 is a flowchart of a process 500 for determining obvious outliers based on dimensions data. The process 500 can be performed as part of training the one or more machine learning models in FIG. 2. For example, the process 500 can be performed to clean the training data and identify an appropriate dataset to use for training the one or more models. The process 500 can also be performed during runtime. As a result of performing the process 500 during runtime, obvious outliers can be flagged such that they do not need to be run through the one or more models. This can be beneficial to improve processing speed, efficiency, accuracy in detecting outliers, and avoid or otherwise reduce false positive and/or false negative determinations.

The process 500 can be performed by the computer system 102. The process 500 can also be performed by one or more other computing systems, devices, computers, networks, cloud-based systems, and/or cloud-based services. For illustrative purposes, the process 500 is described from the perspective of a computer system.

Referring to the process 500, the computer system can select a category of items in 502. In some implementations, the computer system may only select a category that has been updated to include new items and/or has been updated to include new/changed dimensions data for one or more items in the category. The computer system can select an item in the category in 504. In some implementations, the computer system can select an item that has been updated to include new/changed dimensions data.

In 506, the computer system can determine whether dimensions data for the selected item satisfies one or more outlier rule(s). The computer system can therefore apply one or more rules (e.g., conditions) that can be used for identifying obvious outliers. The rules can be applicable to items of any category. In some implementations, one or more of the rules can be specific to particular item categories. As described herein, the rules can be blanket rules that define an item as an outlier or not.

An example rule can identify an item as an outlier if a weight or any other dimensions data of the item exceeds some predetermined threshold value. For example, if height, width, and/or depth of the item is equal to or greater than 150 inches, regardless of the item category, the item can be identified as an outlier. As another example, maximum weight values can be set for each category with items that exceed the maximum weight value for that category identified as outliers. In another example, maximum values for height, width, and/or depth dimensions can be set according to item category. Another example rule can identify an item as an outlier if any of its dimensions data has a value of 0 or a negative value. Another rule can identify an item as an outlier if any of its dimensions data has a null value or otherwise is missing/incomplete. Another example rule can identify an item as an outlier if its width, height, depth dimensions are equal to 1×1×1. One or more other blanket rules can also be used to determine whether an item is an obvious outlier in the item category.

If one or more of the rules are not satisfied, the computer system can proceed to block 512, discussed further below. If one or more of the rules are satisfied, the computer system can flag the item as an outlier in 508. Since the item is flagged as an outlier, that item may not be run through the one or more machine learning models described herein. Instead, items that have not been identified as obvious outliers in the process 500 can be run through the models. This can be advantageous to reduce use of available or limited computing resources, reduce use of electricity, increase processing power, and improve processing efficiency and accuracy in detecting outliers in an item category.

The computer system can also generate instructions about the flagged item (510). As described throughout this disclosure, the instructions can be provided to a user device or other computer system. For example, the instructions can be transmitted to a user device of a retail employee or other relevant user in the retail environment. The instructions can also be transmitted to an item supplier and/or a shipping entity. The instructions can indicate that the flagged item should be digitally, physically, manually, and/or automatically inspected to check and/or update the item's dimensions data. One or more other instructions can be generated, as described throughout this disclosure.

In 512, the computer system can determine whether there are more items in the category. If there are more items, the computer system can return to block 504 and repeat 506-510 for each remaining item in the category. In some implementations, the computer system may only return to block 504 and repeat 506-510 for items that have been updated with new and/or changed dimensions data. Thus, the blocks 506-510 may not be repeated for items in the category that have not been updated with new or changed dimensions data. This can be beneficial to improve processing efficiency, reduce clogging of network bandwidth, and reduce usage of available compute resources.

If there are no more items in the category in 512, the computer system can determine whether there are more categories to assess in 514. If there are more categories, the computer system can return to block 502 and repeat 504-512 for each of the remaining categories. As similarly mentioned above, the computer system may repeat blocks 504-512 only if a remaining category has items that have been updated with new and/or changed dimensions data or if new items have been added to the category. Thus, the blocks 504-512 may not be repeated for categories that have not been updated. This can provide the same benefits as mentioned above.

If there are no more categories to assess in 514, the computer system can output the instructions for the flagged item(s) (516). The computer system can output instructions per flagged item. In some implementations, the computer system can group the instructions based on item category and then output the instructions by category. The instructions can be outputted in a variety of ways and presented to the relevant users throughout the supply chain, as described herein.

Figure 6:
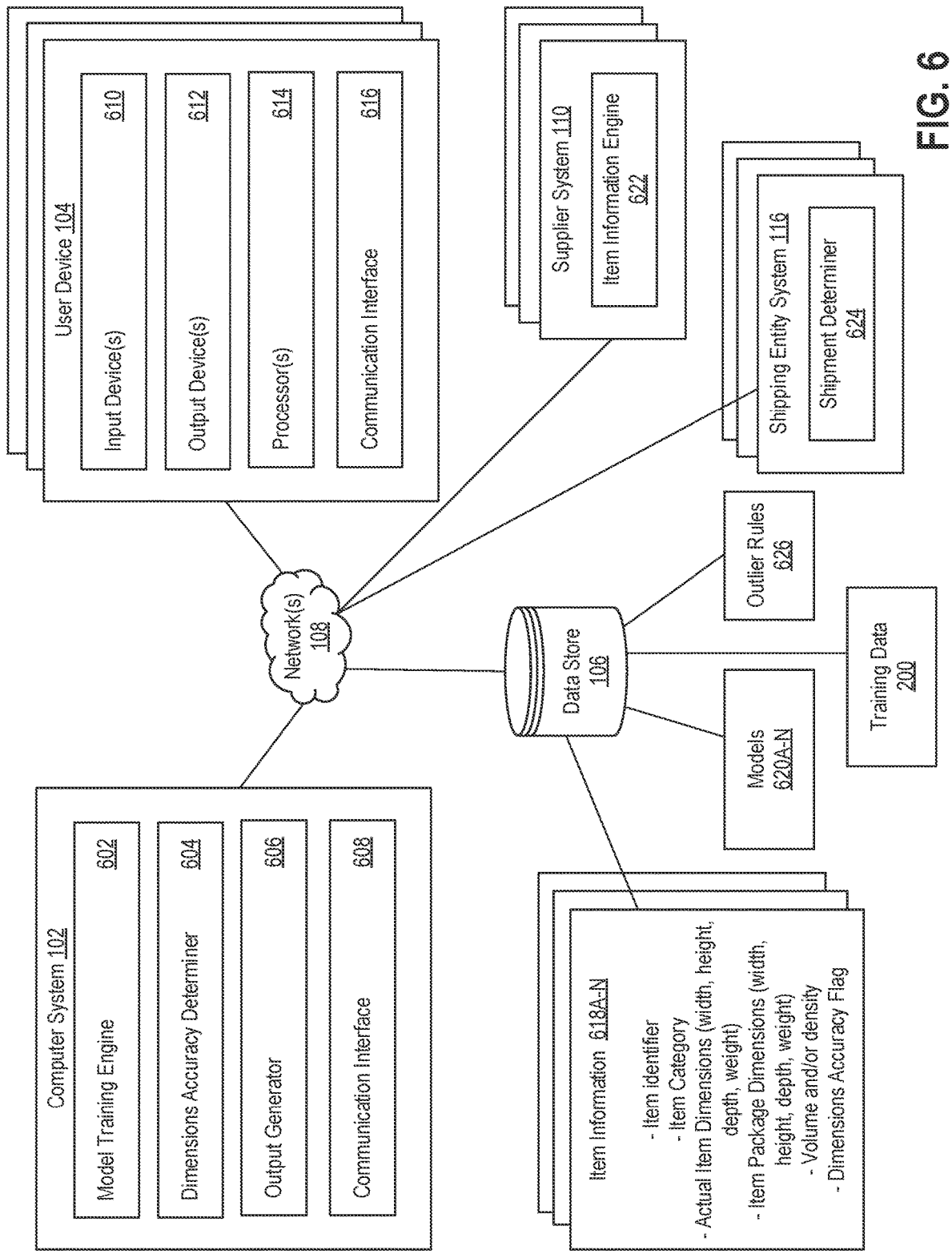
FIG. 6 is a system diagram depicting one or more components that can be used to perform the techniques described herein.

FIG. 6 is a system diagram depicting one or more components that can be used to perform the techniques described herein. As described herein, the computer system 102, user device 104, data store 106, supplier system 110, and shipping entity system 116 can be in communication via the network(s) 108. One or more other devices and/or systems can also be in communication via the network(s) 108. Although the components 102, 104, 106, 110, and 116 are depicted as separate systems and/or devices, one or more of these components can also be integrated into a computing system, network, cloud-based system, and/or cloud-based service.

The computer system 102 can include a model training engine 602, dimensions accuracy determiner 604, output generator 606, and communication interface 608. The model training engine 602 can be configured to train the one or more models described throughout this disclosure. In some implementations, the engine 602 can be part of a different/separate computing system. The model training engine 602 can receive training data 200 from the data store 106. Using the training data 200, the engine 602 can train the models described herein. The engine 602 can also train the ensemble model to perform majority voting and determine whether an item is in fact an outlier or likely to be an outlier in a category of items. The models trained and generated by the engine 602 can then be stored as models 620A-N in the data store 106. Refer to FIG. 2 for additional discussion about training the models.

The dimensions accuracy determiner 604 can be configured to identify items that are outliers based on accuracy of their dimensions data. The determiner 604 can retrieve the models 620A-N from the data store 106. The determiner 604 can also receive item dimensions data to be provided as input to the models 620A-N. For example, the item dimensions data can be stored in item information 618A-N in the data store 106. The item information 618A-N can indicate, for each item, an item identifier, item category (e.g., type), actual item dimensions (e.g., width, height, depth, weight), item package dimensions (e.g., width, height, depth, weight), volume and/or density, and/or dimensions accuracy flag. One or more other information associated with the item can be stored and accessed in the item information 618A-N.

The determiner 604 can also receive the item dimensions data from the user device 104 and/or the supplier system 110. For example, a retail environment employee can manually input dimensions data into the user device 104, which can be transmitted to the computer system 102 for processing/analysis. As another example, the supplier system 110 can include an item information engine 622. The item information engine 622 can be configured to store information about the supplier's items. A relevant user may also provide information about the supplier's items to the item information engine 622. The engine 622 can accordingly update information about the supplier's items. The information that is stored and/o updated by the engine 622 can be transmitted to the computer system 102 and used by the dimensions accuracy determiner 604 for further processing and/or analysis.

Output generated by the determiner 604 can indicate a likelihood that the item is an outlier, whether the item is in fact an outlier, etc. For example, the determiner 604 can apply the models 620A-N and the ensemble model to the item dimensions data. The determiner 604 can also retrieve one or more outlier rules 626 from the data store 106. Using the retrieved outlier rules 626, the determiner 604 can identify obvious outliers. By identifying and flagging the obvious outliers, the determiner 604 can then apply the models 620A-N to only items dimensions data that was not identified as obvious outliers. This can be beneficial to save compute resources, improve efficiency in processing power, and also improve prediction accuracy of the models 620A-N.

The output generator 606 can be configured to generate instructions about items that are flagged as outliers. For example, output of the determiner 604 can be received by the output generator 606. The generator 606 can then generate instructions, notifications, messages, etc. that can provide guidance about how to respond to the outlier flagging. For example, and as described throughout this disclosure, the output can include notifications to be sent to the user device 104 that prompt the user to digitally inspect the dimensions data for the flagged item and/or physically inspect the flagged item in the retail environment, warehouse, distribution center, or other facility. The output can also include an automated message that is transmitted to the supplier system 110 requesting updated dimensions data for the flagged item. The output can also include an automated message with instructions to execute, by the computer system 102 or another computing system, an automated systemic check of the dimensions data for the flagged item.

The output may also include a notification about correct dimensions data to be transmitted to the shipping entity system 116. The shipping entity system 116 may include e shipment determiner 624. The shipment determiner 624 can identify appropriate shipping costs, handling, and/or scheduling based on the dimensions data that is provided to the shipping entity system 116 by the computer system 102. As a result, and as described herein, the shipment determiner 624 can identify appropriate shipping costs based on accurate dimensions data such that the retail environment and/or other relevant stakeholders are not charged shipping costs related to inaccurate dimensions data.

The user device 104 can include input device(s) 610, output device(s) 612, processor(s) 614, and a communication interface 616. The user device 104 can be any one of a laptop, computer, tablet, mobile phone, smart phone, or other electronic device that can be used by a retail environment employee or other relevant user. The input device(s) 610 can include any one or more devices that can receive input from the user, including but not limited to a touchscreen display, keyboard, mouse, microphone, camera, and/or other sensor(s) (e.g., RFID readers, scanners, etc.). The user can, for example, input item dimensions data at the user device 104 using the input device(s) 610, which can then be transmitted to the computer system 102 for further processing and analysis.

The output device(s) 612 can include any one or more devices that can output information to the user, including but not limited to a touchscreen display, a display screen, speakers, projectors, etc. Instructions and/or notifications generated by the output generator 606 can be presented at the user device 104 via the output device(s) 612.

The processor(s) 614 can be configured to execute instructions at the user device 104 to perform one or more actions/techniques described herein. For example, the processor(s) 614 can execute instructions that cause a mobile application or other software to be presented to the user in a GUI or multiple GUIs at the output device(s) 612. The application or software can prompt the user for input regarding item dimensions data, inspection of items, review of dimensions data, etc. The application or software can also provide the output generated by the output generator 606 in various GUIs that are presented at the output device(s) 612.

Finally, the communication interfaces 608 and 616 can be configured to provide communication between one or more of the systems, components, and/or devices described herein.

Figure 7:
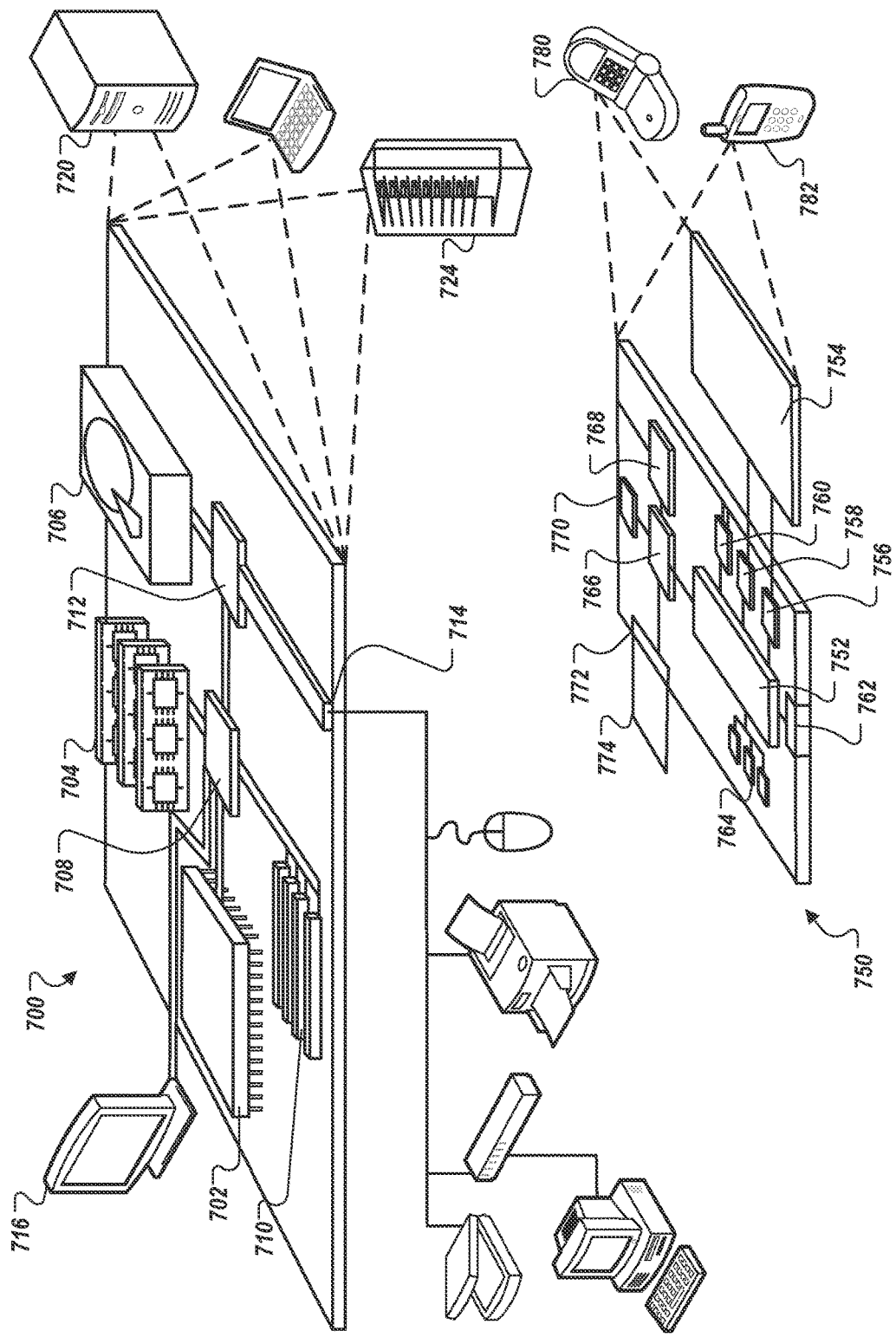
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multiprocessor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provide as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for determining an accuracy metric of dimensions data for an item, the method comprising:
  receiving, by a computing system, dimensions data for an item;
  retrieving, by the computing system and from a data store, one or more machine learning models that were trained, using a training dataset of dimensions data for other items and positive dimensions accuracy determinations for the other items, to determine accuracy of the dimensions data for the item relative to similar items in a same category of items;
  applying, by the computing system, the one or more models to the dimensions data;
  determining, by the computing system and based on application of the one or more models to the dimensions data, an accuracy metric of the dimensions data for the item, the determining comprising:
    determining an accuracy metric based on application of each of the one or more models to the dimensions data;
    identifying a quantity of the accuracy metrics that are below a predetermined threshold value;
    determining whether the quantity is greater than a predetermined threshold quantity; and determining, based on the quantity being greater than the predetermined threshold quantity, that the item is an outlier; and generating, by the computing system, output indicating the accuracy metric of the dimensions data for the item.

2. The method of claim 1, wherein the dimensions data includes at least one of height, width, depth, weight, volume, and density of the item.

3. The method of claim 1, wherein the dimensions data includes at least one of height, width, depth, weight, volume, and density of an actual size of the item without corresponding item packaging.

4. The method of claim 1, wherein the dimensions data includes at least one of height, width, depth, weight, volume, and density of the item with corresponding item packaging.

5. The method of claim 1, wherein generating, by the computing system, output indicating the accuracy metric of the dimensions data for the item comprises determining whether the accuracy metric of the dimensions data for the item exceeds a predetermined threshold value.

6. The method of claim 5, further comprising:
determining, by the computing system and based on the accuracy metric being less than the predetermined threshold value, that the item is an outlier; and
generating, by the computing system, output indicating that the item is an outlier.

7. The method of claim 1, wherein the one or more models include at least one of principle component analysis, minimum covariant determinant, isolation forest, max z-score via standard deviation, and max z-score via median deviation.

8. The method of claim 1, wherein generating, by the computing system, output indicating the accuracy metric of the dimensions data for the item comprises determining one or more operations to be performed to increase the accuracy metric of the dimensions data for the item, wherein the one or more operations include at least one of contacting a supplier for updated dimensions data for the item, requesting a physical inspection of the item, requesting a digital inspection of the dimensions data for the item, and automatically performing a systemic check of the dimensions data for the item.

9. The method of claim 1, further comprising generating, by the computing system, the training dataset based on:
identifying dimensions data of the other items that exceeds a predetermined threshold range; and
removing the identified dimensions data of the other items from the training dataset.

10. The method of claim 9, wherein the predetermined threshold range includes at least one of a weight of any of the other items that exceeds a threshold weight range, a dimension of 0 inches for any of the other items, a dimension of more than 150 inches for any of the other items, and weight, depth, and height of 1×1×1 inches for any of the other items.

11. A method for determining an accuracy metric of dimensions data for an item, the method comprising:
receiving, by a computing system, dimensions data for an item;
retrieving, by the computing system and from a data store, one or more machine learning models that were trained, using a training dataset of dimensions data for other items and positive dimensions accuracy determinations for the other items, to determine accuracy of the dimensions data for the item relative to similar items in a same category of items;
applying, by the computing system, the one or more models to the dimensions data;
determining, by the computing system and based on application of the one or more models to the dimensions data, an accuracy metric of the dimensions data for the item, the determining comprising:
identifying a category associated with the item;
determining whether the dimensions data for the item is within a predetermined threshold range of dimensions data for other items in the category associated with the item; and
identifying, based on determining that the dimensions data for the item is not within the predetermined threshold range, the item as an outlier in the category associated with the item; and
generating, by the computing system, output indicating the accuracy metric of the dimensions data for the item.

12. The method of claim 11, wherein the dimensions data includes at least one of height, width, depth, weight, volume, and density of the item.

13. The method of claim 11, wherein the dimensions data includes at least one of height, width, depth, weight, volume, and density of an actual size of the item without corresponding item packaging.

14. A system for determining item dimension accuracy, the system comprising:
one or more processors; and
one or more computer-readable devices including instructions that, when executed by the one or more processors, cause the computerized system to perform operations that include:
receiving, by a computing system, dimensions data for an item;
retrieving, by the computing system and from a data store, one or more machine learning models that were trained, using a training dataset of dimensions data for other items and positive dimensions accuracy determinations for the other items, to determine accuracy of the dimensions data for the item relative to similar items in a same category of items;
applying, by the computing system, the one or more models to the dimensions data;
determining, by the computing system and based on application of the one or more models to the dimensions data, an accuracy metric of the dimensions data for the item, the determining comprising:
determining an accuracy metric based on application of each of the one or more models to the dimensions data;
identifying a quantity of the accuracy metrics that are below a predetermined threshold value;
determining whether the quantity is greater than a predetermined threshold quantity; and
determining, based on the quantity being greater than the predetermined threshold quantity, that the item is an outlier; and
generating, by the computing system, output indicating the accuracy metric of the dimensions data for the item.

15. The system of claim 14, wherein the dimensions data includes at least one of height, width, depth, weight, volume, and density of the item.

16. The system of claim 14, wherein generating output indicating the accuracy metric of the dimensions data for the item comprises determining whether the accuracy metric of the dimensions data for the item exceeds a predetermined threshold value.

17. The system of claim 16, the operations further including:

determining, based on the accuracy metric being less than the predetermined threshold value, that the item is an outlier; and generating output indicating that the item is an outlier.

18. The system of claim 16, wherein generating output indicating the accuracy metric of the dimensions data for the item comprises determining one or more operations to be performed to increase the accuracy metric of the dimensions data for the item, wherein the one or more operations include at least one of contacting a supplier for updated dimensions data for the item, requesting a physical inspection of the item, requesting a digital inspection of the dimensions data for the item, and automatically performing a systemic check of the dimensions data for the item.

19. The system of claim 16, the operations further including generating the training dataset based on:

identifying dimensions data of the other items that exceeds a predetermined threshold range; and removing the identified dimensions data of the other items from the training dataset.

20. A system for determining item dimension accuracy, the system comprising:

one or more processors; and one or more computer-readable devices including instructions that, when executed by the one or more processors, cause the computerized system to perform operations that include:

receiving, by a computing system, dimensions data for an item;

retrieving, by the computing system and from a data store, one or more machine learning models that were trained, using a training dataset of dimensions data for other items and positive dimensions accuracy determinations for the other items, to determine accuracy of the dimensions data for the item relative to similar items in a same category of items;

applying, by the computing system, the one or more models to the dimensions data;

determining, by the computing system and based on application of the one or more models to the dimensions data, an accuracy metric of the dimensions data for the item, the determining comprising:

identifying a category associated with the item;

determining whether the dimensions data for the item is within a predetermined threshold range of dimensions data for other items in the category associated with the item; and identifying, based on determining that the dimensions data for the item is not within the predetermined threshold range, the item as an outlier in the category associated with the item; and generating, by the computing system, output indicating the accuracy metric of the dimensions data for the item.

* * * * *